US008289870B2

(12) United States Patent
Michaelis et al.

(10) Patent No.: US 8,289,870 B2
(45) Date of Patent: Oct. 16, 2012

(54) PRIORITY-BASED, DYNAMIC OPTIMIZATION OF UTILIZED BANDWIDTH

(75) Inventors: Paul Roller Michaelis, Louisville, CO (US); Richard Alan Windhausen, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 169 days.

(21) Appl. No.: 12/565,428

(22) Filed: Sep. 23, 2009

(65) Prior Publication Data

US 2011/0069625 A1     Mar. 24, 2011

(51) Int. Cl.
*H04L 12/28* (2006.01)
*H04J 3/16* (2006.01)

(52) U.S. Cl. ......... 370/252; 370/431; 370/468; 379/243

(58) Field of Classification Search ................. 370/252, 370/329, 431, 468, 477; 379/208.01, 243
See application file for complete search history.

(56) References Cited

U.S. PATENT DOCUMENTS

| 5,526,350 | A | 6/1996 | Gittins et al. |
| 6,538,989 | B1 | 3/2003 | Carter et al. |
| 6,934,752 | B1 * | 8/2005 | Gubbi ............................ 370/401 |
| 7,072,344 | B2 * | 7/2006 | Abdelilah et al. ....... 370/395.21 |
| 7,289,453 | B2 * | 10/2007 | Riedel et al. .................. 370/252 |
| 7,319,667 | B1 | 1/2008 | Biederman |
| 7,324,523 | B2 * | 1/2008 | Dacosta .................... 370/395.41 |
| 2003/0152096 | A1 * | 8/2003 | Chapman ...................... 370/412 |
| 2004/0107092 | A1 | 6/2004 | Harada |
| 2004/0240390 | A1 | 12/2004 | Seckin |
| 2007/0140116 | A1 | 6/2007 | Vega-Garcia |
| 2008/0062877 | A1 * | 3/2008 | Chen .............................. 370/235 |
| 2009/0028182 | A1 * | 1/2009 | Brooks et al. .................. 370/466 |
| 2009/0147684 | A1 * | 6/2009 | Majidi-Ahy ................... 370/236 |
| 2010/0020681 | A1 * | 1/2010 | Nakashima et al. ........... 370/229 |
| 2010/0027457 | A1 * | 2/2010 | Okuda ........................... 370/315 |
| 2010/0061235 | A1 * | 3/2010 | Pai et al. ..................... 370/230.1 |
| 2010/0316063 | A1 * | 12/2010 | Zhou et al. ..................... 370/431 |
| 2011/0044262 | A1 * | 2/2011 | Satapathy et al. ............. 370/329 |

FOREIGN PATENT DOCUMENTS

EP      2071756 A1     6/2009

OTHER PUBLICATIONS

Craven et al., "DVoIP: Dynamic-Voice-Over-IP Transformations for Quality of Service in Bandwidth Constrained Environments", Lockheed Martin Advanced Technology Laboratories, 2008, 6 pages.
Curran et al., "Transcoding media for bandwidth constrained mobile devices", available at http://portal.acm.org/citation.cfm?id=1056168.1056170, International Journal of Network Management, vol. 15, Issue 2, Mar. 2005, 3 pages. (Abstract only).
Extended Search Report for European Patent Application No. 10178227.4, dated Mar. 23, 2011 6 pages.

* cited by examiner

*Primary Examiner* — Kerri Rose (74) *Attorney, Agent, or Firm* — Sheridan Ross P.C.

(57) ABSTRACT

Methods, devices, and systems are provided for performing priority-based codec conversions. Such conversions may implemented on calls sharing a link having limited bandwidth and may also be implemented after the call has been established but before the call has been terminated. The mechanisms provided herein maximize per-user call completion/quality and overall utilization of network bandwidth by dynamically adjusting encoding algorithms and transmission characteristics of calls using the constrained link.

19 Claims, 3 Drawing Sheets

PRIORITY-BASED, DYNAMIC OPTIMIZATION OF UTILIZED BANDWIDTH

FIELD OF THE INVENTION

The invention relates generally to communications and more specifically to bandwidth management.

BACKGROUND

Voice over Internet Protocol (VoIP) is a general term for a family of transmission technologies used to deliver voice communications over IP networks such as the Internet or other packet-switched networks. Other terms frequently encountered and synonymous with VoIP are IP telephony, Internet telephony, voice over broadband (VoBB), broadband telephony, and broadband phone.

Internet telephony refers to communications services—voice, facsimile and other such communications transmissions, and/or voice-messaging applications—that are transported via the Internet, rather than the public switched telephone network (PSTN). The basic steps involved in originating an Internet telephone call include conversion of the analog voice signal to digital format and translation of the signal into Internet protocol (IP) packets for transmission over the Internet; the process is reversed at the receiving end.

VoIP systems employ session control protocols, such as the Session Initiation Protocol (SIP), to control the set-up and tear-down of calls as well as the selection of audio codecs which encode speech allowing transmission over an IP network as digital audio via an audio stream. The advantage to VoIP is that a single network can be utilized to transmit data packets as well as voice and video packets between users, thereby greatly simplifying communications.

SIP is an open signaling protocol for establishing many kinds of real-time and near-real-time communication sessions, which may also be referred to as dialogs. Examples of the types of communication sessions that may be established using SIP include voice, video, and/or instant messaging. These communication sessions may be carried out on any type of communication device such as a personal computer, laptop computer, telephone, cellular phone, Personal Digital Assistant, etc. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

In VoIP and SIP telephony, the audio-encoding algorithm specified by ITU-T standard G.711 is commonly used when voice quality is a high priority. This technique has an encoded-data bandwidth requirement of approximately 64,000 bits per second, per voice-flow direction. Combining both voice-flow directions and adding packet-format overhead, roughly 174,000 bits per second of bandwidth is typically required to support a two-way communication utilizing G.711. Even higher-quality codecs in the G.722 family require approximately the same bandwidth as G.711. Another commonly used technique, G.729, utilizes only 8,000 bits per second per voice-flow direction, but the voice quality is below that of G.711. Similar tradeoffs occur when using various types of video codecs or any other compression technology utilized during real-time or near-real-time communications.

When an enterprise uses IP to interconnect the telephony systems at their different locations (e.g., when branch offices are linked to the main office though an IP link) the enterprise's contract with the service provider will often specify the maximum bandwidth that may be carried on each of the IP links at any given time. In many cases, there is no ability to exceed the amount specified in the contract because the physical equipment made available by the service provider rarely has capacity beyond the contracted amount. This means that, when the full contracted amount of bandwidth is being utilized, attempts to initiate additional phone calls via that IP link will fail or be denied. Similarly, other attempts to utilize bandwidth over the full IP link will fail or be denied.

One solution for this problem is to use alternative routing, such as via the Public Switched Telephone Network (PSTN), for calls that cannot be carried on the IP link due to bandwidth limitations. This solution has the disadvantages of potentially being more expensive than utilizing the IP link, having less flexibility or functionality than could otherwise be offered if the IP link were utilized, and requiring additional Operation, Administration, Maintenance and Provisioning (OAM&P) complexity to configure and maintain the facility. Another factor that can make this approach impractical is that many branch office locations do not have their own local interface to the PSTN; instead, they rely on PSTN gateways that can be accessed only via the IP link.

Beyond the basic capacity concerns, and more importantly, there is no mechanism to ensure that the contracted bandwidth is utilized in a way that cross-optimizes call quality, individual users' specific priority of service, and full consumption of all available link capacity (i.e., leaving no contracted bandwidth 'unspent'). Without this optimization, techniques to manage link bandwidth are somewhat crude, without needed sophistication in considering the requirements of specific applications or users, and minus an emphasis on ensuring that the link bandwidth that's being paid for is fully occupied in the manner most advantageous to the contracting customer.

In order to keep their costs down, while reducing the likelihood that calls won't go through, the compromise commonly adopted is to encode inter-location calls using G.729, and then contract for enough bandwidth to cover the maximum number of anticipated simultaneous calls. There are several disadvantages of this approach, including: (1) no calls, even the "important" ones, receive the higher acoustic benefit of G.711 or other high-quality codecs; (2) during non-peak times, enterprises are paying for bandwidth that they are not using; and (3) all calls are treated equally, with no opportunity for variation in approach or capability.

SUMMARY

It is, therefore, one aspect of the present invention to provide a more intelligent solution to utilize constrained bandwidth efficiently.

In accordance with at least some embodiments of the present invention mechanisms are proposed for actively signaling some established calls utilizing a managed link to drop to a lower-bandwidth codec for a voice call, illustratively to create bandwidth 'space' on a fully occupied link to accommodate another call. Alternatively, or in addition, mechanisms are provided to actively signal an established call to utilize a higher-quality high-bandwidth codec, illustratively to more fully utilize contracted bandwidth on a link that's not fully occupied by improving the quality (expanding the bandwidth) of calls initially established with lower-quality codecs.

The control of calls may be done in groupings or on a per-call basis while the call(s) is/are in progress.

In accordance with at least some embodiments of the present invention, established calls are controlled by transmitting control signals to one or more of the communication endpoints or intermediate devices (e.g., a proxy) involved in the call. Receipt of a control signal at one or more of these devices may cause all devices involved in the call to re-negotiate a new codec. Alternatively, or in addition, the devices may pre-negotiate back-up codecs prior to receiving a control signal and upon receiving a control signal may automatically switch to using the pre-negotiated codec.

As can be appreciated by one skilled in the art, embodiments of the present invention are not necessarily limited to voice calls, but may also be utilized in controlling video calls and other real-time or near real-time communications.

It is at least one aspect of the present invention to control calls, and more specifically the bandwidth utilized by such calls, based on considerations such as remaining network bandwidth, packet-loss rate, call quality, and cross-user priority. In addition, the amount of audio or video-packet redundancy can be adjusted on a per-call basis while the call is in progress. This is particularly useful because, if an IP link is experiencing voice or video-quality problems that are attributable to packet loss, the impact on voice or video quality associated with switching from a high-bandwidth codec to a low-bandwidth codec might be reduced if the low-bandwidth audio packets are transmitted redundantly (which still permits retention of some of the bandwidth-reduction benefit.) Further, the changes to call streams are additionally managed to take full advantage of all available link capacity.

As noted above, standard prior art practices compel all calls to be encoded with G.711 (or better) if doing so would not exceed the allowable bandwidth. Keeping in mind that, for many links to small enterprise locations, this is likely to happen only when the number of calls on the IP link is relatively small, and that the addition of more G.711 calls to the IP link will eventually cause the system to approach its bandwidth limitation, embodiments of the present invention are capable of shifting an appropriate number of calls from G.711 (or any other type of relatively high-quality but high bandwidth consuming codec) to G.729 (or any other type of relatively lower-quality but lower bandwidth consuming codec) as more calls are added on the IP link. Similarly, if there is a decrease in the number of calls on the link, calls that are encoded with G.729 can be converted to G.711, G.722, or another higher-quality, higher bit-rate codec. This is achieved by signaling that would cause the renegotiation of the audio encoding mid-call on a per-call basis.

It is one aspect of the present invention to provide priority metrics as a basis for determining which calls should be next-in-line for a modification of encoding algorithms in response to changing network conditions or entry of new calls into the link mix. The basis for these priority metrics, and the number of adjustment criteria to be supported, can be expected to vary based on the needs of the enterprise. Factors that might be the basis for assigning an audio-encoding priority level to a call include, but are not limited to: (1) the number of parties on the call; (2) the job title or job grade of at least one of the individuals on the call, or the relative titles/grades of the various parties on all calls being carried on the link; (3) whether the call includes a business customer of the enterprise; (4) willingness to pay for better voice quality; (5) the remaining link bandwidth; (6) Real Time Control Protocol (RTCP) quality data; (7) the business nature of the branch location being connected; (8) the nature or importance of the topics being discussed on the call; (9) whether the call was scheduled or was established ad hoc; and (10) combinations thereof. Many other considerations could also come into play in assigning priority classes for a user or for a location.

One exemplary implementation is to utilize call control techniques in conjunction with the Avaya Aura™ Communication Manager Multi-Level Priority and Preemption (MLPP) feature. Normally in an MLPP environment, a user marked with a higher priority than a second user can take over the trunk facilities being used by the second user, causing that user's call to drop. With embodiments of the present invention, the second user's call can be dropped to a lower-bandwidth codec, allowing the higher-priority users call to be 'squeezed into' the overall link bandwidth without causing the other call to be lost. Another example of a priority-based conversion would be to force a lower-priority call to a lower-bandwidth codec so a higher-priority user could employ a high-bandwidth, highest-quality codec.

In any of these cases, the codec conversions can be slanted toward ensuring a best fit between call quality for all parties involved in calls on the link and maximum consumption of link capacity for those calls (to ensure that the link is always being best utilized). Of course, care would need to be taken to build some hysteresis into the signaling so that calls aren't overly 'down-' or 'up-shifted,' so that consistency of call quality can be adequately protected.

Another transmission factor that can be varied mid-call and on a per-call basis is audio packet redundancy of the sort that is specified by RFC-2198, the entire contents of which are incorporated herein by reference. Subject to the bandwidth limitations of the IP link, the determination of which calls should have their audio packets sent redundantly can be based on the priority level of the call. In this context, two other factors can be considered: (1) For any given audio encoding algorithm, the acoustic benefits of redundant transmission become more evident as the packet loss rate of the IP link increases; and (2) for any given non-zero packet loss rate on the IP link, the loss of packets in a G.729-encoded audio stream will tend to be more evident to the human ear than the loss of a similar percentage of packets in a G.711 stream.

For these reasons, if an IP link is experiencing voice-quality problems that are attributable to packet loss, one embodiment of the present invention might reduce the deleterious effects of switching from G.711 to G.729 by activating a redundant transmission mode as part of the switch. (Illustratively, the data rate for non-redundant G.711 transmission is approximately double that of a duplicated G.729 stream, meaning that, even with redundant transmission, a switch from G.711 to G.729 still yields a very significant bandwidth reduction.)

Although some exemplary embodiments of the present invention are described in connection with "G.711" and "G.729" as illustrative examples of audio encoding algorithms, one skilled in the art will appreciate that embodiments of the present invention are not so limited. G.711 is one of several high quality, high bandwidth encoding algorithms that may be used in IP telephony. Another example is G.722. Similarly, G.729 is one of several low bandwidth algorithms that has somewhat lower voice quality. Another example is GSM.

In accordance with at least some embodiments of the present invention, a method is provided that generally comprises:

receiving a request from a first communication device to utilize bandwidth of a communication link having a limited available bandwidth;

identifying a first call that is currently established over the communication link and consuming at least a portion of the limited available bandwidth;

while the first call is still established over the communication link, causing the first call to adjust its bandwidth utilization; and accommodating the request from the first communication device such that a second call involving the first communication device is established over the communication link.

In accordance with at least some embodiments of the present invention, a method of managing a communication link having a limited available bandwidth is provided, the method generally comprising:

determining that a first call has been terminated, wherein, prior to termination, the first call was established over the communication link and consumed at least a portion of the limited available bandwidth; and in response to determining that the first call has been terminated, causing a second call to adjust its bandwidth utilization, wherein the second call is also established over the communication link.

In some embodiments, instructions for performing the methods of the present invention may be stored on a computer-readable medium and may be used by a processor to execute said methods. The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to manage calls on a communications link having constrained bandwidth.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
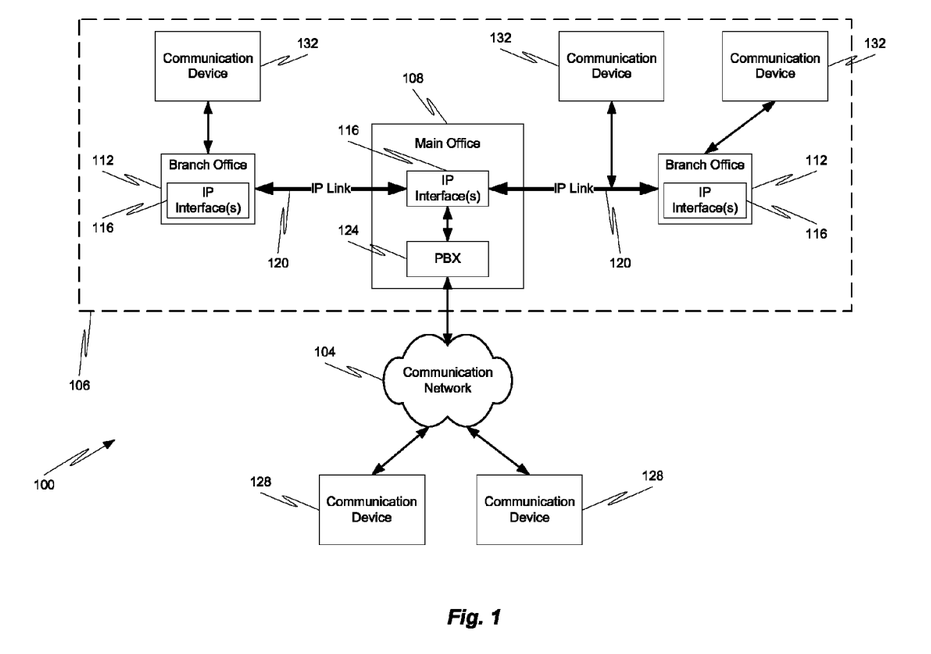
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 may comprise a communication network 104 that connects an enterprise network 106 to one or more non-enterprise communication devices 128. Particularly, the communication network 104 provides the communication facilities that allow enterprise communication devices 132 to communicate with the non-enterprise communication devices 128.

In accordance with at least some embodiments of the present invention, the communication network 104 may comprise the PSTN, a standard Plain Old Telephone System (POTS), an Integrated Services Digital Network (ISDN), a Local Area Network (LAN), a Wide Area Network (WAN), a Session Initiation Protocol (SIP) network, any type of enterprise or non-enterprise network, and any other type of packet-switched or circuit-switched network known in the art. In addition, it can be appreciated that the communication network 104 need not be limited to any one network type, and instead may be comprised of a number of different networks and/or network types.

The user devices or endpoints 128, 132 may be any type of known communication or processing device such as a personal computer, laptop, Personal Digital Assistant (PDA), cellular phone, smart phone, telephone, analog phone, digital phone, or combinations thereof. In general, the user devices may be adapted to support video, audio, text, and/or data communications with other communication devices. The type of medium used by the user devices to communicate with other communication devices may depend upon the communication applications available on the communication device and/or the applications provided by the enterprise network 106.

As can be seen in FIG. 1, some enterprise communication devices 132 may be connected to a branch office 112 while other communication devices 132 may be directly connected to a communication link 120 between the main office 108 and the branch office 112. In accordance with at least some embodiments of the present invention, it may be possible to establish a Virtual Private Network (VPN) connection between a communication device and either the branch office 112 or main office 108. The establishment of such a connection may result in the utilization of bandwidth available on the communication link 120.

In accordance with at least some embodiments of the present invention, the branch offices 112 may comprise IP interfaces 116 that facilitate IP connections with an IP interface 116 at the main office 108. Using these IP interfaces 116, the branch offices 112 are adapted to connect to the communication network 104 via the main office 108. Specifically, the main office 108 is provided with a Private Branch eXchange (PBX) 124 or similar type of switch/server that facilitates a connection between the enterprise network 106 and external communication devices 128. Since PBXs 124 can be an expensive piece of equipment, often times enterprise networks 106 will purchase PBXs 124 for less than every location in the enterprise network 106 (i.e., one or more branch offices 112 may not be equipped with a PBX 124). Therefore, some branch offices 112 may not have the facilities or capabilities to connect a call directly to the communication network 104 for a requesting device. Rather, if a communication devices 132 at a branch office 112 attempts to call a non-enterprise number, the branch office 112 will have to establish a connection with the main office 108 which will invoke some resources of the PBX 124 on behalf of the branch office 112. This type of outbound call will require a certain amount of bandwidth from the communication link 120.

A similar situation will occur when inbound calls are received at a communication device 132 connected to the branch office 112. More specifically, if the non-enterprise communication device 128 calls a communication device 132 and that communication device 132 is connected only to a branch office 112 or has a VPN connection, then the call will be routed through the main office 108 at the PBX 124 and then through one of the communication links 120.

The communication links 120 may comprise any type of known packet-based communication link. Often times the communication link is established with a packet router, SIP/IP telephony gateway, and/or modem and a local Internet Service Provider (ISP) supports the communication link 120. Since the bandwidth available over the link 120 costs a certain amount of money to the enterprise 106, there is often a desire to minimize the amount of available bandwidth. Sometimes a fixed bandwidth is established for the communication link 120. In this configuration, no extra bandwidth for the link 120 will ever be available unless additional hardware components are added to the IP interface(s) 112. In an alternative configuration, the ISP may establish one or more bandwidth utilization thresholds that, if exceeded by the enterprise, will result in an escalated cost structure. In this configuration, the enterprise may have access to more bandwidth beyond the usage threshold, but it is quite likely that the enterprise will not want to utilize such bandwidth because of the additional costs associated therewith. Accordingly, a mechanism is proposed herein to manage the bandwidth utilization of this communication link 120 and any other type of link having constrained bandwidth.

Figure 2:
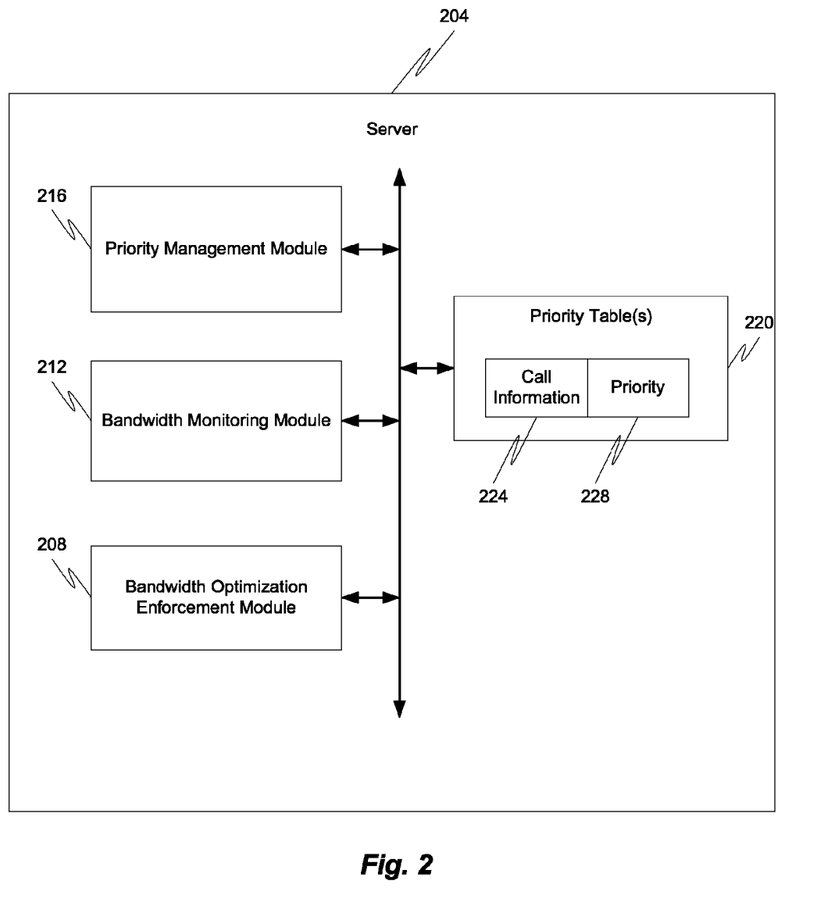
FIG. 2 is a block diagram depicting an exemplary server in accordance with at least some embodiments of the present invention.

With reference now to FIG. 2, an exemplary server 204 will be described that is capable of managing bandwidth on a bandwidth constrained communication link 120. The server 204 may be provided at one or more of the main office 108 and branch office 112. Furthermore, the functionality of the server 204 may be split among multiple servers at multiple locations. Although not depicted, the server 204 may also be equipped with an IP interface 116 for facilitating the intra-enterprise communications over the communication link 120.

The server 204 may comprise a bandwidth optimization enforcement module 208, a bandwidth monitoring module 212, a priority management module 216, and a priority table 220 (or plurality of priority tables 220). These modules may be implemented separately, or implemented in any combination with each other or other server modules. Each of the modules may be provided as instructions stored in memory of the server 204 that are executable by a processor also residing on the server 204. The bandwidth monitoring module 212 is responsible for and capable of monitoring one or more of the maximum bandwidth available on a communication link 120, the current utilization of bandwidth on a communication link 120, the number and types of calls established on the communication link, and so forth. The bandwidth monitoring module 212 may also be adapted to determine information about the call (e.g., number of participants involved, identities of participants involved, when the call was established, if the call has been terminated, etc.). The bandwidth monitoring module 212 may be capable of populating a call information field 224 in the priority table 220 with information related to the details of the call.

In some embodiments, the bandwidth monitoring module 212 may only be responsible for monitoring a single communication link 120 (e.g., if the server 204 is deployed at the branch office 112). In other embodiments, the bandwidth monitoring module 212 may be responsible for monitoring multiple communication links 120 (e.g., if the server 204 is deployed at the main office 108).

The priority management module 216 is adapted to communicate with the bandwidth monitoring module 212 to identify the calls currently established on the communication link 120. The priority management module 216 may also be adapted to identify the communication devices or users of communication devices participating on a call established on the communication link 120. This information may be retrieved by directly analyzing the call(s) or by referencing the call information field 224 that has been populated by the bandwidth monitoring module 212.

The priority management module 216 utilizes this information to determine relative priorities for each call. The relative priority information for the calls established on a particular communication link 120 can be stored in the priority field 228 of the priority table 220. If the server 204 is managing a plurality of communication links 120, then multiple priority tables 220 may be maintained for each link 120.

As can be appreciated by one skilled in the art, the priority management module 216 may be adapted to utilize any number of different algorithms for determining a relative call priority. In some embodiments each call itself may be assigned an absolute priority. The absolute priority may be established either by virtue of the participants involved on the call or by virtue of the importance of the call itself (e.g., an emergency call to 911 or some other emergency number may be provided with a higher priority than other non-emergency calls). If each call is assigned an absolute priority, then the priority management module 216 can compare the absolute priority values assigned to each call to determine a relative priority ranking for all calls. The call having the highest absolute priority would be assigned the highest relative priority, the call having the second highest absolute priority would be assigned the second highest relative priority, and so forth. Alternatively, or in addition, each participant on a call may have their own absolute priority. In this situation, the priority management module 216 may assign a call an absolute priority value (and ultimately a relatively priority ranking) based on the highest priority participant on the call. Alternatively, the priority management module 216 may determine a weighted average of all participants' priorities to determine an absolute priority value for the call. The priority value of a multi-party call may change dynamically as participants join or leave the call. Other types of call priority determination schemes will also become readily apparent to those skilled in the art.

The types of variables that may be considered by the priority management module 216 when assigning a call a priority include, but are not limited to: (1) the number of parties on the call; (2) the job title or job grade of at least one of the individuals on the call, or the relative titles/grades of the various parties on all calls being carried on the link; (3) whether the call includes a business customer of the enterprise 106; (4) willingness to pay for better voice quality; (5) the remaining link 120 bandwidth; (6) Real Time Control Protocol (RTCP) quality data; (7) the business nature of the branch location 112 being connected; (8) the nature or importance of the topics being discussed on the call; (9) whether the call was scheduled or was established ad hoc; and (10) combinations thereof.

The bandwidth optimization enforcement module 208 is responsible for administering bandwidth utilization optimization algorithms for a communication link 120 or plurality of communication links 120. In some embodiments the bandwidth optimization enforcement module 208 is adapted to refer to the priority table 220 and determine if the bandwidth utilization of a call currently established on the communication link 120 should be adjusted (i.e., either increased or decreased). The bandwidth optimization enforcement module 208 may make such a determination and may enforce such determinations on a per-call basis or on a group basis (i.e., multiple calls can have their bandwidth utilization adjusted simultaneously). The optimization goals for the bandwidth optimization enforcement module 208 may include attempting to simultaneously maximize bandwidth utilization, maximize collective call quality, maximize number of call requests allowed, minimize cost, and minimize dropped calls. The optimization goals may be considered individually or simultaneously. One example of simultaneously considering optimization goals includes attempting to minimize costs while also attempting to maximize bandwidth utilization. Another example of simultaneous optimization goals that may be pursued is attempting to maximize collective call quality while also attempting to maximize bandwidth utilization. More than two optimization goals may also be considered simultaneously.

In accordance with at least some embodiments of the present invention, the bandwidth optimization enforcement module 208 may be adapted to allow as many calls on a communication link 120 as possible at as high a quality as possible. The bandwidth optimization enforcement module 208 may refer to the priority table 220 to prioritize which calls will be allowed to utilize higher quality codecs and which calls may need to utilize slightly lesser quality codecs in an attempt to maximize call quality for higher priority calls while also maximizing bandwidth utilization. Some existing calls may need to have their codecs adjusted or their transmission characteristics adjusted (e.g., codecs may need to be re-negotiated to a higher or lower quality codec and transmission characteristics may need to be re-negotiated depending upon whether new calls are established on the communication link 120 or dropped). One skilled in the art will appreciate that the bandwidth optimization enforcement module 208 may not attempt to maximize bandwidth utilization to the point where 100% of the total available bandwidth is utilized at any one time. Rather, the bandwidth optimization enforcement module 208 may target a fraction of the maximum available bandwidth (e.g., 80%, 85%, 90%, etc.) as the amount of bandwidth that should be used at any given time.

Figure 3:
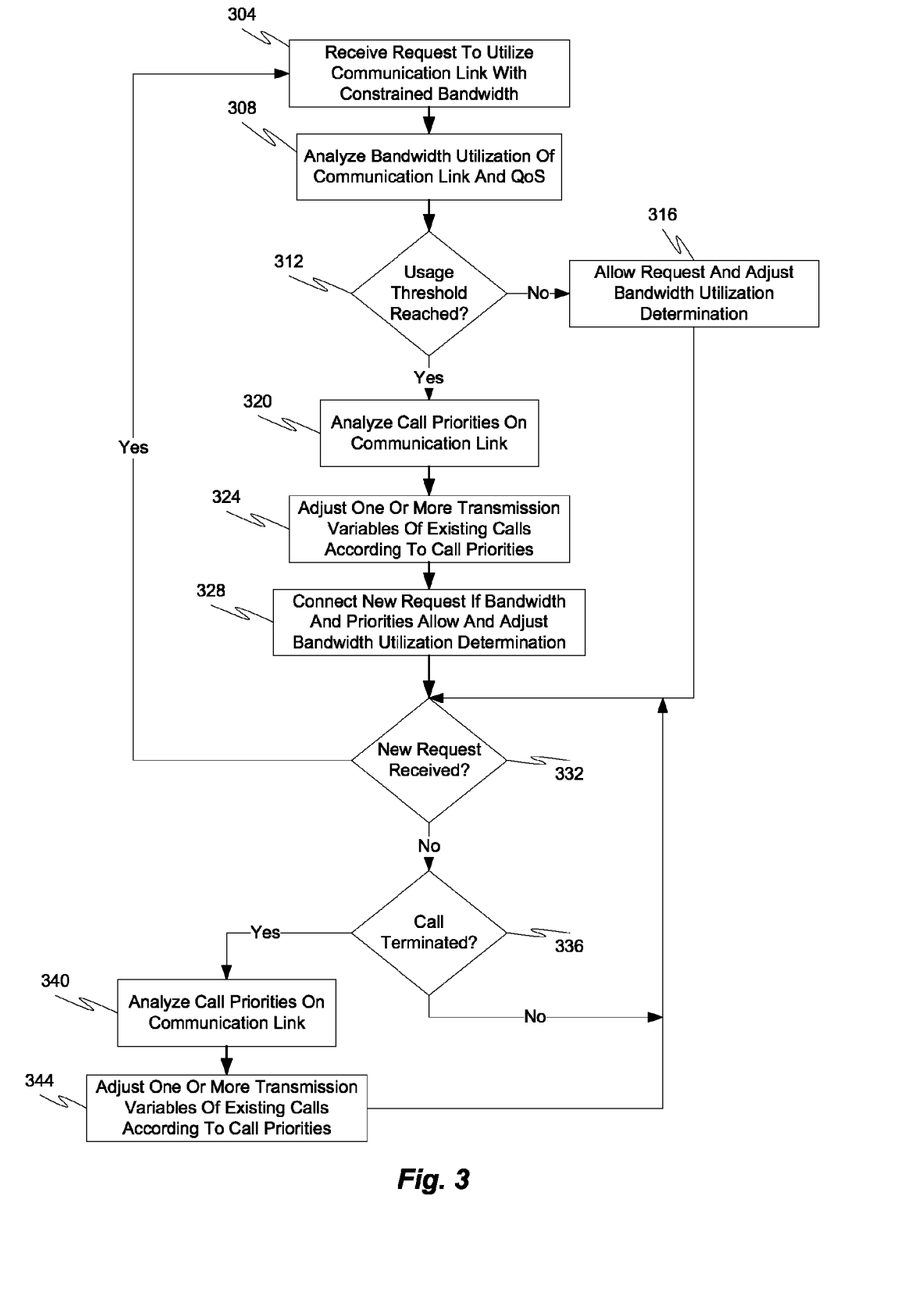
FIG. 3 is a flow diagram depicting a method of managing bandwidth in accordance with at least some embodiments of the present invention.

Referring now to FIG. 3, an exemplary bandwidth management method will be described in accordance with at least some embodiments of the present invention. The method is initiated when a request to utilize bandwidth on the communication link 120 is received at the server 204 (step 304). This request may correspond to a call setup request or some other type of call signaling used to establish a communication path over the communication link 120.

The receipt of this request prompts the bandwidth optimization enforcement module 208 to query the bandwidth monitoring module 212 for current bandwidth utilization information at the communication link 120 (step 308). The bandwidth optimization enforcement module 208 may also request Quality of Service (QoS) information (e.g., jitter, delay, packet loss, etc.) about the communication link 120. This information is analyzed by the bandwidth optimization enforcement module 208 to determine if a bandwidth usage threshold has been reached (step 312). The bandwidth usage threshold may correspond to a percentage utilization of total available bandwidth and may also be related to a trigger point that will cause the bandwidth optimization enforcement module 208 to begin altering the bandwidth utilization of some calls on the communication link 120 away from their initially negotiated bandwidth utilization parameters (e.g., encoding algorithms and transmission characteristics).

As can be appreciated by one skilled in the art, multiple usage thresholds may exist. One threshold (e.g., 70% of maximum available bandwidth) may exist for the bandwidth optimization enforcement module 208 to begin reducing bandwidth utilization of existing calls. This threshold, if exceeded, may cause the bandwidth optimization enforcement module 208 to begin reducing the bandwidth utilization of one or more existing calls on the communication link 120 in an attempt to make sure enough room exists on the communication link 120 for the new call. Another threshold (e.g., 10% of maximum available bandwidth) may exist for the bandwidth optimization enforcement module 208 to begin increasing bandwidth utilization of existing calls. If bandwidth utilization falls below this particular threshold (usually due to a low number of calls on the communication link 120), this may cause the bandwidth optimization enforcement module 208 to increase the bandwidth utilization of one or more calls using the communication link 120.

If the usage threshold has not been reached (or dropped below), then the method will continue by allowing the call to be completed on the communication link 120 (step 316). The bandwidth monitoring module 212 may also be adapted to update its records for bandwidth utilization on the communication link 120 to reflect the newly added call.

If, however, the usage threshold has been reached, then the method continues with the bandwidth optimization enforcement module 208 analyzing the call priorities on the communication link 120 to determine which one or more of the existing calls will have their bandwidth utilization adjusted to accommodate the new request (step 320). More specifically, the bandwidth optimization enforcement module 208 may be adapted to determine, based on the relative ranking of existing calls on the communication link 120, which calls have already had their bandwidth utilization adjusted to accommodate optimization and which calls are next in line to have their bandwidth utilization adjusted to accommodate optimization.

Based on this determination, the bandwidth optimization enforcement module 208 will cause one or more calls on the communication link 120 to adjust its bandwidth utilization by altering one or more transmission variables (i.e., encoding algorithm or transmission characteristics such as redundant packet transmissions) (step 324). This may be done by generating a control packet or control signal which can be transmitted to one or more of a communication device 128, 132 participating on the call, an IP interface 116 supporting the call, or a PBX 124 supporting the call. The control packet or control signal may cause the recipient to initiate renegotiation of transmission variables. Alternatively, the devices may have pre-negotiated backup transmission variables that would be used in the event that adjustment of bandwidth utilization became necessary.

Once the bandwidth utilization has been adjusted on one or more of the existing calls, the method continues with the server 204 allowing the request to be forwarded to the appropriate entity. This ultimately results in the establishment of the call (step 328). Establishment of the call may also include causing the devices to negotiate a set of transmission variables that are different from default or preferred transmission variables. This may be done prior to establishment of the call depending upon the call's priority relative to other existing calls.

Once the call has been established, the method continues by determining whether a new request has been received (step 332). If so, the method returns to step 304. If not, the method continues to step 336 where it is determined if a call on the communication link 120 has been terminated.

If no call has been terminated, then the method returns back to step 332. If, on the other hand, a call has been terminated and more bandwidth has become available on the communication link 120, then the method proceeds with the bandwidth optimization enforcement module 208 analyzing the call priorities of the remaining calls on the communication link 120 (step 340). The bandwidth optimization enforcement module 208 continues, if possible, by adjusting one or more transmission variables of one or more calls on the communication link 120 (step 344). Specifically, the bandwidth optimization enforcement module 208 may analyze the relative priorities of the calls remaining on the communication link 120 and may further determine which call(s) is next to have its bandwidth utilization adjusted and possibly have the quality of the call improved. The bandwidth utilization on the communication link 120 may also be re-determined to maintain an updated accounting of the bandwidth utilization on the communication link 120. Thereafter, the method returns to step 332.

In accordance with at least some embodiments of the present invention, it may be desirable to build in a certain amount of hysteresis into the system to ensure that one or more calls do not have their transmission variables altered an undesirable number of times, particularly within a predetermined amount of time. More specifically, a timer function may be utilized when a call has its transmission variables altered (i.e., the call changes its bandwidth utilization). This starts the timer counting down from the predetermined amount of time. The call may be restricted from having its transmission variables altered again until the timer has counted down to zero. One skilled in the art will appreciate that a timer starting at zero would count up and the call may be restricted from having its transmission variables altered until the timer has reached the predetermined time. The predetermined value used for the timer function may be user configurable and/or may be dynamically altered during the call (e.g., a user involved in a call can ask that a greater or lesser time be required before the call is eligible to have its transmission variables altered).

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for managing bandwidth and optimizing usage thereof. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   receiving a request and request priority from a first communication device to utilize bandwidth of a communication link having a limited available bandwidth, wherein the request priority is assigned based on factors, the factors comprising information related to at least one of an individual on a call, a plurality of individuals on the call, a customer-paid quality level, a business nature of a call center, a topic nature of the call, and a scheduling status of the call;
   identifying a first call and first priority that is currently established over the communication link and consuming at least a portion of the limited available bandwidth, wherein the first priority is assigned based on the factors;
   while the first call is still established over the communication link, causing the first call to adjust its bandwidth utilization; and
   wherein adjusting bandwidth utilization comprises one or more of priority-based adjusting encoding algorithms used on the first call and priority-based adjusting transmission characteristics of the first call; and
   accommodating the request from the first communication device such that a second call involving the first communication device is established over the communication link.

2. The method of claim 1, wherein both encoding algorithms and transmission characteristics of the first call are adjusted.

3. The method of claim 1, wherein the first call employs a first encoding algorithm prior to having its bandwidth utilization adjusted and wherein the first call employs a second encoding algorithm after having its bandwidth utilization adjusted.

4. The method of claim 3, wherein the first encoding algorithm comprises a higher bit rate than the second encoding algorithm.

5. The method of claim 3, wherein the first encoding algorithm comprises a lower bit rate than the second encoding algorithm.

6. The method of claim 1, wherein adjusting transmission characteristics of the first call comprises activating a redundant transmission mode having an adjustable transmission quality level for the first call; and
   wherein the adjustable transmission quality level is dynamically adjusted based on the priority of the request and the first call.

7. The method of claim 1, wherein the first call comprises one or more of a voice call, video call, data call, and conference call and wherein the second call comprises one or more of a voice call, video call, data call, and conference call.

8. The method of claim 1, further comprising:
   determining a priority of one or more users participating in the first call;
   determining a priority of a user that is using the first communication device; and
   performing the causing step based on the priority determined for the one or more users participating in the first call and the priority determined for the user that is using the first communication device.

9. The method of claim 8, further comprising:
   determining that the priority determined for the one or more users participating in the first call is lower than the priority determined for the user that is using the first communication device; and
   wherein the first call is adjusted to utilize less bandwidth.

10. A method of managing a communication link having a limited available bandwidth, the method comprising:
    determining that a first call has been terminated, wherein, prior to termination, the first call was established over the communication link and consumed at least a portion of the limited available bandwidth; and
    in response to determining that the first call has been terminated, causing a second call to adjust its bandwidth utilization, wherein the second call is also established over the communication link; and
    wherein adjusting bandwidth utilization comprises one or more of priority-based adjusting encoding algorithms used on the second call and priority-based adjusting transmission characteristics of the second call, wherein the priority-based adjustments are made according to priorities that are assigned based on factors, the factors comprising information related to at least one of an individual on a call, a plurality of individuals on the call, a customer-paid quality level, a business nature of a call center, a topic nature of the call, and a scheduling status of the call.

11. The method of claim 10, wherein both the first and second call are established over the communication link and utilize the limited available bandwidth of the communication link prior to termination of the first call.

12. The method of claim 10, wherein both encoding algorithms and transmission characteristics of the second call are adjusted.

13. The method of claim 10, wherein the second call employs a first encoding algorithm prior to having its bandwidth utilization adjusted and wherein the second call employs a second encoding algorithm after having its bandwidth utilization adjusted.

14. The method of claim 13, wherein the first encoding algorithm comprises a lower bit rate than the second encoding algorithm.

15. The method of claim 10, wherein adjusting transmission characteristics of the second call comprises activating a redundant transmission mode having an adjustable transmission quality level for the second call; and
    wherein the adjustable transmission quality level is dynamically adjusted based on the priority of the second call.

16. A server, comprising:
    a processor;
    a bandwidth monitoring module operating in connection with the processor and adapted to monitor bandwidth consumption on a communication link having a limited available bandwidth;
    a priority management module operating in connection with the processor and adapted to identify a relative priority of calls established on the communication link, wherein the relative priority of calls are assigned based on factors, the factors comprising information related to at least one of an individual on a call, a plurality of individuals on the call, a customer-paid quality level, a business nature of a call center, a topic nature of the call, and a scheduling status of the call; and a bandwidth optimization enforcement module operating in connection with the processor and adapted to retrieve the relative priority information from the priority management module and based on the relative priority information adjust bandwidth consumption of at least one call while the call is established on the communication link.

17. The server of claim 16, wherein a first call and a second call are simultaneously established on the communication link and utilize the limited available bandwidth of the communication link, wherein the first call comprises a higher priority than the second call.

18. The server of claim 17, wherein the relative priority information is maintained in a priority table by the priority management module and wherein the priority table is accessible by the bandwidth optimization enforcement module.

19. The server of claim 17, wherein the bandwidth optimization enforcement module is adapted to perform one or more of the following:
  (i) determine that the limited available bandwidth of the communication link is completely or nearly completely consumed and in response to making such a determination decrease bandwidth consumption of the second call without decreasing bandwidth consumption of the first call; and
  (ii) determine that the limited available bandwidth of the communication link is not completely or nearly completely consumed and in response to making such a determination increase bandwidth consumption of the first call without increasing bandwidth consumption of the second call.

* * * * *